United States Patent [19]

Kropp

[11] 3,951,532
[45] Apr. 20, 1976

[54] MICROFICHE READER EMPLOYING DUAL INCREMENTAL ADVANCING MEANS

[75] Inventor: Willis A. Kropp, DeLand, Fla.

[73] Assignee: Personal Communications, Inc., Stamford, Conn.

[22] Filed: Apr. 11, 1974

[21] Appl. No.: 460,015

[52] U.S. Cl............................ 353/25; 353/27 R; 33/1 M; 33/1 D
[51] Int. Cl.².......................................... G03B 23/02
[58] Field of Search............ 353/25, 27, 26, 22–24, 353/122, 95, 96, 39; 355/53, 54, 86, 95; 33/184.5, 1 M, 1 D

[56] References Cited
UNITED STATES PATENTS

| | | | |
|---|---|---|---|
| 3,389,477 | 6/1968 | DeMaria et al. | 33/184.5 |
| 3,617,125 | 11/1971 | Sobottke | 355/53 |
| 3,617,125 | 11/1971 | Sobottke | 355/53 |
| 3,704,068 | 11/1972 | Waly | 353/27 |
| 3,712,724 | 1/1973 | Courtney-Pratt | 353/25 |

Primary Examiner—Richard E. Aegerter
Assistant Examiner—Larry Jones
Attorney, Agent, or Firm—Duckworth, Hobby & Allen

[57] ABSTRACT

A microfiche reader includes first and second plates, with a plurality of light sources disposed with the first plate in an array of rows and columns, and a plurality of lens disposed with the second plate in a row-column array, each lens corresponding to one of the light sources. Means are provided for movably positioning a film having information thereon between the plates, and for moving the film with respect to the plates.

17 Claims, 4 Drawing Figures

MICROFICHE READER EMPLOYING DUAL INCREMENTAL ADVANCING MEANS

DESCRIPTION OF THE PRIOR ART

In U.S. Pat. No. 3,704,068 to Waly, there is disclosed a microimage technique for recording information in a reduced scale on a film surface and for reproducing the microimages in an enlarged scale by means of an optical reader. The reader is characterized by a lens matrix constituted of a planar array of lensettes having short focal lengths, each of which is adapted to enlarge a respective portion of a group of characters in a microimage. This arrangement requires means for indexing the microimage film relative to the lens matrix whereby successive microimages are presented on some projecting medium.

A number of microfilm reader arrangements have been developed in the past. In U.S. Pat. No. 3,442,581, Smitzer et al disclose an arrangement employing parallelism by means of rack and pinion arrangements which provide indexing means for a microfiche reader. A somewhat similar arrangement is disclosed in U.S. Pat. No. 3,632,196 to Pizzol. Novak, in U.S. Pat. No. 3,405,996, discloses a rotatable drum device in which horizontal and vertical movement is provided by guide rails. Rowe, in U.S. Pat. No. 2,501,453, teaches a device in which the selection of images in a pattern is accomplished by means of a compound transfer arm. Related arrangements are disclosed by Simpson et al in U.S. Pat. No. 3,413,061, and Ditscheid in U.S. Pat. No. 3,720,464, as well as in U.S. Pat. No. 3,655,279 to Rathfelder.

SUMMARY OF THE INVENTION

The present invention contemplates a microfiche reader comprising two superposed beams pivotably fitted together at a common pivot intermediate the extremities thereof, with means for holding a film having information thereon, the holding means coupled with the two beams. Means are also provided for scissoring the two beams together to thereby effect movement of the holding means.

THE DRAWING

DETAILED DESCRIPTION

An embodiment of a microfiche reader in accordance with the present invention will now be described in detail with reference to the drawings.

Figure 1:
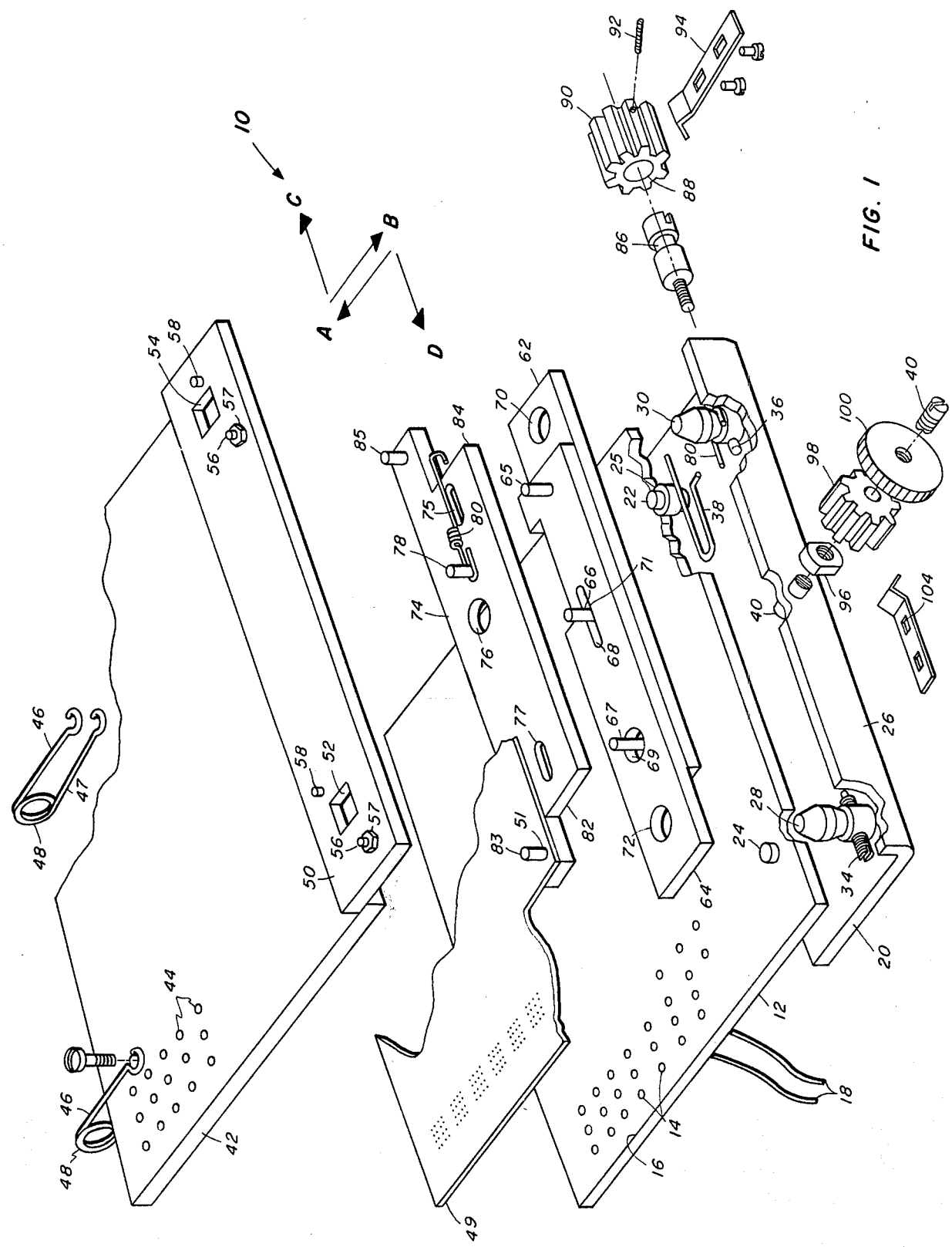
FIG. 1 is an exploded perspective view, partially cut away, illustrating an embodiment of a microfiche reader in accordance with the present invention.

Noting FIG. 1, the reader, referred to generally as 10, includes a light source plate 12 having a plurality of light sources 14 disposed across the upper surface 16 thereof in an array of rows and columns, in a manner similar to that described in the aforementioned Waly U.S. Pat. No. 3,704,068. These light sources may be supplied by fiber optic paths 18.

An end plate 20 is fixed to one end of the light source plate 12 and parallel thereto by studs 22 and 24, with standoffs 25 positioned between each respective stud and the two plates. The end plate 20 includes an upstanding wall 26 extending normal thereto.

Two extending posts 28, 30 are provided, one each on opposing sides of the end plate 20. Noting FIG. 3, each indexing post 28, 30 has two bevels along the outer surface thereof, including a first outward bevel 32 from the extremity of the post, and thereafter an inward bevel 33 toward the end plate 20, with a straight shoulder 31 between the two bevels. Posts 28, 30 further include a threaded hole for receiving a corresponding limiting and indexing screw 34 and 36. The screw 34 adjustably limits movement of a beam 74 while the screw 36 initiates such adjustment. A spring 38 is biased between the standoff 25 and one of two beams 64, as described below. Another indexing screw 40 extends through the wall 26. The indexing screws 36 and 40 are associated with incremental advancing means which is described in detail below.

Figure 2:
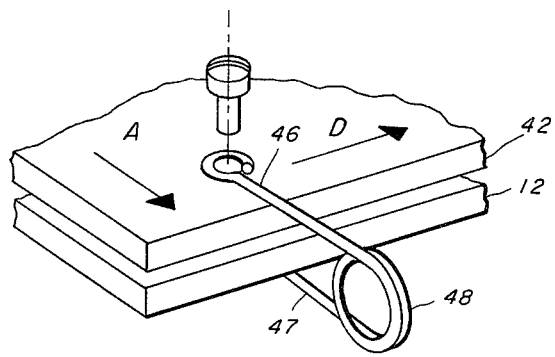
FIG. 2 is a perspective view of a portion of the apparatus shown in FIG. 1.

Referring to the upper portion of FIG. 1, the reader 10 further includes a lens plate 42 having a plurality of lens 44 positioned thereon in a row-column array, as is described in the aforementioned patent to Waly. Noting FIGS. 1 and 2, the lens plate 42 is hingedly joined at one end to the light source plate 12 by the arms 46, 47 of two coil springs 48. A microfiche film 49, for example of the type described by Waly, is positioned between the lens plate 42 and the light source plate 12. The film 49 includes positioning holes 51 along one side, which accurately engage two pins 83 and 85.

Figure 3:
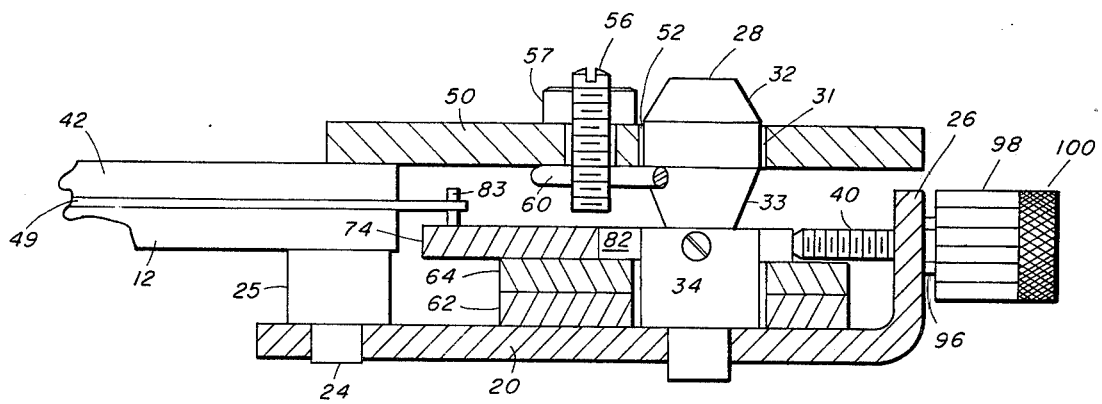
FIG. 3 is a side view, partially in cross section, of a portion of the apparatus shown in FIG. 1.
Figure 4:
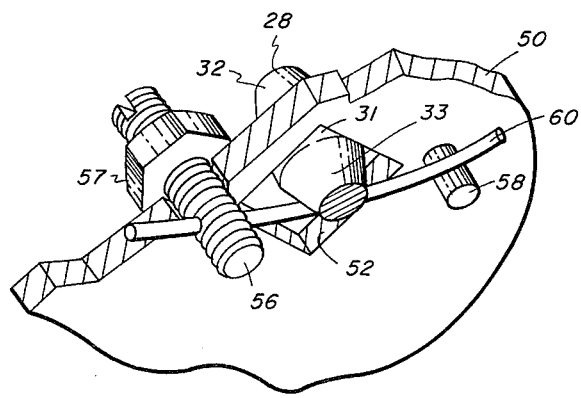
FIG. 4 is a perspective view, partially cut away, of a portion of the apparatus shown in FIG. 1.

As shown in FIGS. 1, 3 and 4, the lens plate 42 includes an indexing plate 50 rigidly fixed thereto at the end opposite the coil springs 48. The indexing plate 50 includes two square openings 52, 54. The indexing posts 28, 30 partially extend through the openings when the lens plate 42 and the light source plate 12 are fitted together. Threaded studs 56 extend through the indexing plate 50, one adjacent the square opening 52 and the other adjacent the square opening 54. A nut 57 holds the threaded stud 56 fast, and in radial position to effect optimum bias of a rod 60 against the post 33. An additional stud 58 extends into the indexing plate 50 on a side of the respective opening 52, 54, opposing the corresponding threaded stud 56. The threaded stud 56 includes a lateral hole therein with the resilient spring rod 60 fitted therein. The rods 60 bear against the surfaces 33 of the studs 28 and 30 to bias the lens plate 42 against the light source plate 12 and also urge the end plate 50 in directions D and A, as described below.

The reader 10 further includes means for incrementally advancing the film 49 in directions normal to and parallel with the wall 26, while maintaining parallelism thereof. In this embodiment, the advancing means includes two rectangular, superposed beams 62 and 64, the lower beam 62 having two upright pins 66 and 67 extending through corresponding openings 68 and 69 in the upper beam 64, the opening 69 being of substantially greater size than the pin 67 with the surface 71 of opening 68 bearing against pin 66. The upper beam 64 also includes a pin 65 at the end thereof, the three pins 65, 66 and 67 being fixed on a common line when the plates are in an adjustment of parallel position. Each beam 62 and 64 has a hole 70 and 72, respectively, at the extremity thereof adapted to mate with the adjacent indexing posts 30 and 28.

The indexing means further includes a third, upper beam 74 having two slots and a hole 75, 77 and 76, respectively, 75 and 77 being disposed to receive the pins 65 and 67 accurately while providing required travel of the plate 50 in directions D and C. The hole 76 receives pin 66 with sufficient clearance to provide movement of pin 66 in directions A and B and movement of beam 74 in directions D and C. The third beam 74 has a stud 78 with a spring 80 coupled thereto and the adjacent indexing post 30. The third beam 74 also includes removed corner portions 82 and 84 opposing the indexing posts 28 and 30 so as to be free of engagement therewith. Two studs 83, 85 extend from the upper surface of the beam 74 in engagement with the holes 51 in the fiche 49.

Reference is again made to the indexing screw 36 extending into the indexing post 30, and the indexing screw 40 extending through the wall 26. In the first instance, the indexing screw 36 includes a shoulder 86 adapted to fit the bore 88 of the notched wheel, or ratchet 90. A set screw 92 fixes the ratchet 90 to the shoulder 86. A pawl spring 94 provides incremental or detent rotation of the ratchet 90. When assembled, the screw 36 bears against the corner portion 84 of the third beam 74. In the second instance, the indexing screw 40 bears against the side of the third beam 74 (note FIG. 3), and further includes a nut 96 and a ratchet wheel 98 idling on the screw 40. A knob 100 screws against the ratchet 98 causing it to bear against nut 96, thus frictionally fixing the radial position of the ratchet 98, as required. A pawl spring 104 is affixed to the under side of 20 by means (not shown) which permits the ridge of that pawl spring to register with slots in ratchet 98 at registration position of the film 49 with the light sources 14 and the lens 44. A set screw is also included extending through a threaded hole in the post 28 so as to bear against the corner portion 52 of the third beam 74 when the reader 10 is assembled (note FIG. 3).

In use, the reader 10 provides means for controlling movement of the microfiche 49 in four directions. For purposes of description, these directions are identified by the letters A, B, C and D in FIG. 1. Direction A is substantially normal to the wall 26, and direction B is in a direction opposite thereto. Directions C and D oppose each other substantially parallel with the wall 26.

Initially, the set screw 34 and the nut 96 are adjusted such that the third beam 74 is positioned so as to insure proper indexing of the fiche 49 with respect to the light sources 14 and the lens 44. These adjustments define the base or "home" position and should require only infrequent adjustment.

Thereafter, right-hand movement of the ratchet 90 causes the indexing screw 36 (assuming conventional threads) to bear against the surface of the corner portion 84 of the third beam 74, effecting movement of the beam 74 in direction D. When left hand movement of the ratchet 90 is effected, the indexing screw 36 is backed away from the beam 74 and the bias of the spring 80 causes movement of that beam in direction C.

In a similar manner, movement of the beam 74 in direction A is caused by right hand rotation of the ratchet 98, forcing the indexing screw 40 against that beam. When the indexing screw 40 is backed away from the third beam 74, movement of the third beam 74 in direction B is effected by the bias of the spring 38 against the second beam 64. The above-described movements are facilitated by the compound scissoring motion of the arrangement of the three beams 62, 64 and 74 and the sliding engagements of pins 65, 66 and 67 with the corresponding holes or slots 75 and 77, and the clearance of hole 76.

For proper operation of the reader 10, it is necessary that the fiche 49 be maintained substantially flat between the light source plate 12 and the lens plate 42, while at the same time the fiche 49 is free to move in the directions A, B, C and D. To accomplish this end, the coil springs 48 and the spring arms 46, 47 maintain the requisite bias at one end of the light source plate 12 and the lens plate 42. At the end defined by the indexing plate 50, each of the spring rods 60 moves across the shoulders 31 of the respective indexing posts 28 and 30. Thereafter, the spring rods 60 bear against the bevel 33 keeping the indexing plate in plane with the shoulders 31 of the indexing posts 28, 30.

I claim:

1. A microfiche reader comprising:
   a first plate;
   a plurality of light sources disposed with said first plate in an array of rows and columns;
   a second plate disposed adjacent said first plate;
   a plurality of lens disposed with said second plate in an array of rows and columns, each lens corresponding to one of said light sources;
   means for movably positioning a film having information thereon between said plates, said positioning means including:
   a beam;
   means for fixing one edge of said film to said beam;
   means for moving said beam in a first direction parallel to the plane of said plates; and
   means for moving said beam in a second direction substantially normal to said first direction and parallel to the plane of said plates.

2. Apparatus as recited in claim 1 wherein said positioning means comprises:
   two additional beams;
   means for pivotably fitting said two additional beams at a common pivot intermediate the extremities thereof; and
   means for joining said one beam to said two additional beams.

3. Apparatus as recited in claim 2 wherein said moving means comprises:
   a screw bearing against one of said beams; and
   means for incrementally advancing said screw.

4. Apparatus as recited in claim 2 further comprising:
   an end plate fixed to said first plate adjacent to an end parallel with said beams;
   a wall extending substantially normal to said end plate and spaced from said beams; and wherein said first screw extends through said wall and bears against said one beam to effect movement thereof in said first direction.

5. Apparatus as recited in claim 4 wherein said incremental advancing means comprises:
   a ratchet axially fitted with and adapted to rotate with said screw; and
   a pawl engaging said ratchet.

6. Apparatus as recited in claim 2 wherein said second direction moving means comprises a spring biased between one of said first and second plates and one of said beams.

7. Apparatus as recited in claim 1 wherein said moving means comprises:
   a beam;
   means for fixing one edge of said film to said beam;

means for moving said beam in one direction lateral to the edge of said beam; and means for moving said beam in another direction opposite to said one direction.

8. Apparatus as recited in claim 7 wherein said one direction moving means comprises:

a screw bearing against an end of said beam;

means for rotatably holding said screw; and means for incrementally advancing said screw.

9. Apparatus as recited in claim 8 wherein said another direction moving means comprises a spring biased between said beam and said holding means.

10. Apparatus as recited in claim 1 wherein said positioning means comprises:

an end plate fixed to and parallel with one end of said first plate;

an indexing plate fixed to and parallel with one of said second plate, said indexing plate having at least one indexing aperture therein;

an indexing post mounted on said end plate and positioned adjacent said indexing aperture; and means for fastening said indexing post in said aperture such that said film is movable between said first and second plates.

11. Apparatus as recited in claim 10 wherein said fastening means comprises:

said indexing post having an outward bevel in an axial direction from the extremity thereof toward said end plate, an inward bevel in said axial direction subsequent to said outward bevel with a straight shoulder between said two bevels; and biasing means fixed to said indexing plate in said aperture and bearing against said inward bevel.

12. Apparatus as recited in claim 10 wherein said positioning means further comprises:

a hinge coupled to said first and second plates at respective ends thereof opposite said end plate and said indexing plate; and means with said hinge for biasing said opposite ends of said first and second plates apart to allow movement of said film therebetween.

13. A microfiche reader comprising:

a substrate, a first beam pivotably connected to said first means at one end thereof, the other end of said first beam rotatable about said one end thereof;

a second beam pivotably connected to said second means at one end thereof, the other end of said second beam rotatable about said one end thereof;

said two beams being pivoted together at a point intermediate the respective ends thereof;

means for holding a microfiche film, said holding means carried by said movable ends of said two beams; and means for moving said rotatable end of said first beam toward and away from said one end of said second beam and for moving said rotatable end of said second beam toward and away from said one end of said first beam, to effect motion of said rotatable ends along an arcuate path to thereby impart motion to said film in a direction transverse to an imaginary line between said fixed ends of said first and second beams.

14. The apparatus recited in claim 13 wherein said holding means comprises a third beam slidably engaged with said rotatable ends of said first and second beams.

15. The apparatus recited in claim 14 further comprising means for fixing an edge of said film to said third beam.

16. The apparatus recited in claim 15 further comprising means for effecting incremental changes in said lateral motion of said third beam.

17. The apparatus recited in claim 16 further comprising means for incrementally advancing said third beam in a direction normal to said transverse direction.

* * * * *